(12) United States Patent
Peterson et al.

(10) Patent No.: US 9,968,124 B2
(45) Date of Patent: May 15, 2018

(54) FREEZE-DRIED, AERATED FRUIT OR VEGETABLE COMPOSITIONS AND METHODS OF MAKING THEREOF

(75) Inventors: Scott Peterson, Spring Lake, MI (US); Frank Welch, Kentwood, MI (US); Thomas Burkholder, East Amherst, NY (US)

(73) Assignee: Nestec S.A., Vevey (CH)

(*) Notice: Subject to any disclaimer, the term of this patent is extended or adjusted under 35 U.S.C. 154(b) by 1423 days.

(21) Appl. No.: 12/599,328

(22) PCT Filed: May 9, 2008

(86) PCT No.: PCT/US2008/063306
§ 371 (c)(1),
(2), (4) Date: Sep. 1, 2010

(87) PCT Pub. No.: WO2008/141229
PCT Pub. Date: Nov. 20, 2008

(65) Prior Publication Data
US 2011/0008515 A1    Jan. 13, 2011

Related U.S. Application Data

(60) Provisional application No. 60/916,956, filed on May 9, 2007.

(51) Int. Cl.
| | | |
|---|---|---|
| *A23P 30/40* | (2016.01) | |
| *A23B 7/024* | (2006.01) | |
| *G06Q 99/00* | (2006.01) | |
| *A23L 29/10* | (2016.01) | |
| *A23L 29/20* | (2016.01) | |
| *A23L 19/00* | (2016.01) | |

(52) U.S. Cl.
CPC ............ *A23P 30/40* (2016.08); *A23B 7/024* (2013.01); *A23L 19/09* (2016.08); *A23L 29/10* (2016.08); *A23L 29/20* (2016.08); *G06Q 99/00* (2013.01); *A23V 2002/00* (2013.01)

(58) Field of Classification Search
CPC .......... A23B 7/024; A23L 1/2128; A23L 1/05
USPC ................................. 426/564, 640
See application file for complete search history.

(56) References Cited

U.S. PATENT DOCUMENTS

| | | | |
|---|---|---|---|
| 2,955,943 A | 10/1960 | Morgan et al. | |
| 3,313,032 A | 4/1967 | Malecki | |
| 3,492,126 A * | 1/1970 | Rubenstein .............. | 426/565 |
| 3,656,971 A | 4/1972 | Reimer | |
| 3,806,610 A | 4/1974 | Rahman | |
| 4,055,675 A | 10/1977 | Popper et al. | |
| 4,080,477 A | 3/1978 | Tsumara et al. | |
| 4,244,981 A | 1/1981 | Blake | |
| 4,368,211 A | 1/1983 | Blake et al. | |
| 4,386,211 A | 5/1983 | Henderson et al. | |
| 4,515,822 A | 5/1985 | Kraig et al. | |
| 4,542,035 A | 9/1985 | Huang et al. | |
| 4,587,130 A * | 5/1986 | Stauber ................... | 426/564 |
| 4,624,853 A | 11/1986 | Rudin | |
| 4,631,196 A | 12/1986 | Zeller | |
| 4,702,923 A | 10/1987 | Sennosuke et al. | |
| 4,855,155 A | 8/1989 | Cavallin | |
| 4,889,730 A | 12/1989 | Roberts et al. | |
| 4,891,235 A | 1/1990 | Mizuguchi et al. | |
| 4,946,697 A | 8/1990 | Payne | |
| 4,948,609 A | 8/1990 | Nafisi-Movaghar | |
| 4,956,185 A | 9/1990 | Cajigas | |
| 5,000,974 A | 3/1991 | Albersmann | |
| 5,093,137 A | 3/1992 | Shazer, Jr. et al. | |
| 5,143,096 A | 9/1992 | Steinberg | |
| 5,147,668 A | 9/1992 | Munk | |
| 5,176,928 A | 1/1993 | Shazer, Jr. et al. | |
| 5,451,419 A | 9/1995 | Schwab et al. | |
| 5,518,740 A | 5/1996 | Costanzo et al. | |
| 5,665,413 A | 9/1997 | Rossiter | |
| 5,959,128 A * | 9/1999 | Kolstad et al. ............... | 554/206 |
| 6,183,803 B1 | 2/2001 | Morcol et al. | |
| 6,361,813 B1 | 3/2002 | Kitaoka et al. | |
| 6,713,100 B1 | 3/2004 | Schmoutz et al. | |
| 6,841,181 B2 | 1/2005 | Jager et al. | |
| 6,998,146 B2 | 2/2006 | Murphy et al. | |
| 7,005,157 B2 | 2/2006 | Engesser et al. | |
| 7,005,175 B2 | 2/2006 | Hachenberg et al. | |
| 7,011,861 B2 | 3/2006 | Nair et al. | |
| 7,033,634 B2 | 4/2006 | Engesser et al. | |
| 7,118,772 B2 | 10/2006 | Froseth et al. | |
| 7,264,835 B2 | 9/2007 | Funk | |
| 2002/0192345 A1 | 12/2002 | Kepplinger et al. | |
| 2003/0113436 A1 | 6/2003 | Fukinbara | |
| 2003/0194468 A1 | 10/2003 | Konkoly | |

(Continued)

FOREIGN PATENT DOCUMENTS

| | | |
|---|---|---|
| CA | 994158 A1 | 8/1976 |
| CA | 2183168 A1 | 9/1995 |

(Continued)

OTHER PUBLICATIONS

McGee, H. 2004. On Food and Cooking. Scribner. pp. 20, 21, 632, 633.*
Beech-Nut Corn and Sweet Potato. 2006. Downloaded from https://web.archive.org/web/20060313015338/http://www.beech-nut.com/ on Mar. 11, 2015.*
Beech-Nut Carrot, Apple & Mango. 2006. Downloaded from https://web.archive.org/web/20060313015338/http://www.beech-nut.com/ on Mar. 11, 2015.*
European Search Report for European Application No. 12004794 dated Aug. 3, 2012.
Beech-Nut (Beech-Nut Carrot, Apple & Mango. 2006) http://web.archive.org/web/20061015193054/http://www.beech-nut.com/Our%20Baby%20Food/product.asp?P=38562&Cateogry=1&SearchValue=4&SearchVals=About%207%20-%208%20Month&ListValue=1&SearchType=By%20Age&ProdType=on Jun. 25, 2013.

(Continued)

*Primary Examiner* — Nikki H. Dees
(74) *Attorney, Agent, or Firm* — Gary M. Lobel, Esq.

(57) ABSTRACT

The present invention comprises a freeze-dried, aerated fruit or vegetable composition comprising a fruit or vegetable ingredient and an emulsifier and methods of making thereof.

18 Claims, No Drawings

(56) References Cited

U.S. PATENT DOCUMENTS

| | | |
|---|---|---|
| 2003/0224089 A1 | 12/2003 | Engesser |
| 2004/0109933 A1 | 6/2004 | Roy et al. |
| 2004/0110442 A1 | 6/2004 | Rhim et al. |
| 2004/0161522 A1 | 8/2004 | Toves |
| 2006/0013925 A1 | 1/2006 | Bauman et al. |
| 2006/0286209 A1 | 12/2006 | Sweley et al. |
| 2006/0286270 A1 | 12/2006 | Jordan |
| 2007/0071866 A1 | 3/2007 | Cox |
| 2009/0324773 A1 | 12/2009 | Peterson |
| 2011/0183041 A1 | 7/2011 | Barniol et al. |

FOREIGN PATENT DOCUMENTS

| | | |
|---|---|---|
| CA | 2546423 A1 | 7/2005 |
| EP | 0118048 A1 | 9/1984 |
| EP | 0331281 A1 | 9/1989 |
| EP | 0461718 A1 | 12/1991 |
| EP | 0897670 A1 | 2/1999 |
| EP | 0649599 B1 | 4/1999 |
| EP | 1048216 A1 | 11/2000 |
| EP | 1430785 A2 | 6/2004 |
| ES | 2001820 A6 | 6/1988 |
| FR | 2019776 A1 | 7/1970 |
| GB | 1070060 A * | 5/1967 |
| GB | 1129804 A | 10/1968 |
| GB | 1343640 A * | 1/1974 |
| GB | 1484167 A | 9/1977 |
| HU | 195094 B | 4/1988 |
| JP | 55159752 A | 12/1980 |
| JP | 6314658 A | 1/1988 |
| JP | 02286039 A | 11/1990 |
| JP | 7079696 A | 3/1995 |
| JP | 9313101 A | 12/1997 |
| JP | 2000210042 A | 8/2000 |
| JP | 200145968 A | 2/2001 |
| JP | 200234462 A | 2/2002 |
| JP | 2004222673 A | 8/2004 |
| JP | 2004236612 A | 8/2004 |
| JP | 2005053049 A | 3/2005 |
| JP | 2005530499 A | 10/2005 |
| JP | 2009148254 A | 7/2009 |
| JP | 2011032673 A | 2/2011 |
| RU | 1837787 A3 | 8/1993 |
| SU | 800538 A1 | 1/1981 |
| WO | 8912407 A | 12/1989 |
| WO | 9505085 A1 | 2/1995 |
| WO | 9900021 A1 | 1/1999 |
| WO | 200060950 A | 10/2000 |
| WO | 0065935 A1 | 11/2000 |
| WO | 2001006865 A1 | 2/2001 |
| WO | 2001019203 A1 | 3/2001 |
| WO | 2001062099 A1 | 8/2001 |
| WO | 03028471 A1 | 4/2003 |
| WO | 03086092 A1 | 10/2003 |
| WO | 03096816 A1 | 11/2003 |
| WO | 2004040991 A2 | 5/2004 |
| WO | 2005096833 A1 | 10/2005 |
| WO | 2008141229 A | 11/2008 |
| WO | 2008141233 A1 | 11/2008 |

OTHER PUBLICATIONS

Functional Foods Fact Sheet: Probiotics and Prebiotics Oct. 15, 2009. Downloaded from http://www.foodinsight.org/Resources/Detail.asp?topic=Functional_Foods_Sheet_Probiotics_and_Prebioics on Aug. 16, 2012

Gerber Graduates. MiniFruits & MiniVeggies. 2005. http://web.archive.org/web/20051026002915/http://gerber.com/toddlersite?tmsdir=food&tmspage=grad_mini.html&tmspromo=2 Downloaded Dec. 8, 2011.

Gerber. Graduates Yogurt Melts—Strawberry. Dec. 18, 2010, pp. 2 http://web.archive.org/web/20101218155236/http://www.gerber.com/AllStages/products/snacks/yogurt_melts_strawberry.aspx.

Harmon, Emily. Gerber Graduates Yogurt Melts: Natural Snacking for Toddlers. Jun. 2, 2008, pp. 3 http://voices.yahoo.com/gerber-graduates-yogurt-melts-natural-snacking-for-1526861.html?cat=25.

Nestle Baby. Gerber Graduates Yogurt Melts. 2007. http://web.nestlebaby.com/sg/baby_nutrition/Products/product_detail.htm?stage=0&id=2950 p. 1.

Stevens, A. 2006. "Inulin and Food: Are You Eating Inulin Unknowingly?" The Diet Channel. Downloaded Jul. 19, 2012 from http://www.thedietchannel.com/Inulin-and-Food-Are-You-Eating-Inulin-Unknowingly.htm.

Tsen, J.-H., King, V.A.-E.2002. "Density of banana puree as a function of soluble solids concentration and temperature." J. Food Eng. Vo. 55. pp. 305-308.

Garcia, et al., "Lowfat Ice Creams from Freeze-Concentrated Versus Heat-Concentrated Nonfat Milk Solids," 1995, J. Diary Sci, 78:2345-2351.

Hartel, et al., "Freeze Concentration of Skim Milk," Journal of Food Engineering 20 (1993), 101-120.

Kumeno, et al., "Production and Characterization of a Pressure-induced Gel from Freeze-concentrated Milk," Biosci. Biotech. Biochem., 57 (5), 750-752, 1993.

Mohamed, et al., "Hard Cheese Making From Camel Milk," Milchwissenschaft 45 (11) 1990, 716-719.

International Search Report for International Application No. PCT/US2008/053582 dated Jun. 26, 2008.

U.S. Appl. No. 13/475,411, Scott Peterson, Office Action dated Mar. 23, 2015.

Kuntz, L.A., "Special Effects With Gums"; Food Product Design, retrieved from http://www.foodproductdesign.com/articles/1999/12/special-effects-with-gums.aspx# on Mar. 11, 2015.

* cited by examiner

FREEZE-DRIED, AERATED FRUIT OR VEGETABLE COMPOSITIONS AND METHODS OF MAKING THEREOF

CROSS REFERENCE TO RELATED APPLICATIONS

This application is a US national stage application filed under 35 USC § 371 of International Application No. PCT/US08/63306, filed May 9, 2008; which claims priority to U.S. Provisional Application No. 60/916,956, filed May 9, 2007.

BACKGROUND

Aerated compositions are known in the art. Aeration can provide desirable characteristics such as light, fluffy textures. It is also known in the art that aerated products are subject to physical and chemical instability and therefore can destabilize over time. One solution to such instability issues in aerated milk-based products includes the addition of a hydrated emulsifier to already cultured dairy products before aeration (See e.g. U.S. Pat. No. 7,005,157, hereinafter "the '157 patent"). Specifically, the '157 patent teaches against adding ingredients directly to the milk blend prior to fermentation because such ingredients can adversely affect processing considerations such as fermentation times. The '157 patent teaches that the addition of a hydrated emulsifier post-fermentation avoids adversely lengthening fermentation times while contributing to stability. Freeze-drying is a process well known in the food industry. It is critical in further drying aerated products that the resulting product retain sensory attributes that are important to consumers. Using the invention taught in the '157 patent, hydration of the aerated product before freeze-drying can detrimentally affect physical stability. For example, a hydrated, aerated product when freeze-dried may result in increased fragility during shipping and handling of the product. Fruit purees are difficult to freeze-dry because of their sugar content. The fruit purees hold onto water, so it is difficult to decouple the sugar and water.

As a further example, dissolvability is an important issue in a freeze-dried product. Specifically, the aerated product, which has been dried and treated with air, must still remain readily dissolvable upon consumption at such a rate as to transfer flavor to the consumer's taste buds. Moreover, the product should be readily dissolvable to reduce the risk of choking hazards for consumers with restricted or underdeveloped oral motor skills or digestive functions. As a known solution, increasing the aeration can improve dissolvability. However, increased aeration has the negative effect of reducing the hardness of the end product. When the hardness is reduced, the physical stability of product can be compromised.

Therefore, there is a need for a product that is freeze-dried and aerated that has improved physical stability and improved dissolvability.

SUMMARY

The present invention comprises a freeze-dried, aerated fruit or vegetable composition comprising a fruit or vegetable ingredient and an emulsifier and methods of making thereof.

DETAILED DESCRIPTION

As used throughout, ranges are used as a shorthand for describing each and every value that is within the range. Any value within the range can be selected as the terminus of the range. When used, the phrase "at least one of" refers to the selection of any one member individually or any combination of the members. The conjunction "and" or "or" can be used in the list of members, but the "at least one of" phrase is the controlling language. For example, at least one of A, B, and C is shorthand for A alone, B alone, C alone, A and B, B and C, A and C, or A and B and C.

"Freeze-dry" is a dehydration process that works by freezing the material and then reducing the surrounding pressure to allow the frozen water in the material to sublimate directly from the solid phase to gas.

"Aeration" is the process of introducing air to increase gas concentration in liquids. Aeration may be performed by bubbling a gas through the liquid, spraying the liquid into the gas or agitation of the liquid to increase surface absorption.

"Dissolvability" is defined as the change in hardness of a product in going from a dry to a wet state.

"Hardness" is defined as the peak stress prior to fracturing a material. Universal Tester model 4465 with 100 N static load cell, manufactured by Instron in Canton, Mass., is used. The probe used for testing is a compression anvil #2830-011. Initial settings for speed of probe were 1 mm/second to approximately 90% compression. Speed based upon journal article in J. Texture Studies, 36 (2005), pp 157-173, "Effects of Sample Thickness of Bite Force for Raw Carrots and Fish Gels." Testing is repeated on 10-15 replicate samples for each variable.

"Viscosity" is defined as a measure of the resistance of a substance to flow. Viscosity is measured using a Brookfield viscometer with a Helipath® stand with an F-T bar before the composition is aerated. Viscosity aids in holding the shape of a substance through aeration and deposit.

The present invention comprises a fruit or vegetable composition useful in the preparation of a freeze-dried, aerated product. The first component of the composition comprises a fruit or vegetable ingredient. The fruit or vegetable ingredient is selected from any ordinarily known in the art. Preferably, the fruit or vegetable ingredient is pureed. The fruit or vegetable ingredient is present in amount of from 60% to 98%, preferably from 70% to 90% and most preferably from 60% to 80% of the composition.

The second component of the present composition comprises an emulsifier. While not wishing to be bound by any theories, it is believed that the emulsifier reduces the surface tension at the air-liquid interface, therefore allowing for stable dispersion of air bubbles within the viscous liquid matrix. The emulsifier is preferably a lactylated mono and diglyceride. The emulsifier may be selected from the group consisting of but not limited to lactic acid esters of mono- and diglycerides, citric acid esters of mono- and diglycerides, distilled monoglycerides, and combinations thereof. While not wishing to be bound by any theories, it is believed that the lactic acid stays in the water phase and the monoglycerides stay in the hydrophobic phase for whipping agent. The lactylated mono and diglycerides are present in an amount of from 0.001 to 1%, preferably from 0.01 to 0.5% and most preferably from 0.1 to 0.4% of the composition. It is believed that the lactylated mono and diglyceride component of the present invention promotes stabilization of the final aerated composition.

The composition of the present invention can further comprise optional ingredients such as starch, gums, whipping aids, sugars and stabilizers. Starches include but are not limited to tapioca, corn and rice. The rice can be native, physically or chemically modified. Gums include but are not limited to pectin, gelatin, carrageenan, locust bean gum, guar gum, cellulose gums, microcrystalline cellulose. Whipping aids include but are not limited to lactic acid esters of mono/diglycerides, as well as other acid esters, and other emulsifiers with foam stabilization ability (polysorbate 80), egg white and whey protein.

Hardness, Dissolvability and Viscosity

The consumer preference for the final product of the present invention is believed to be based on physical characteristics such as hardness, viscosity and dissolvability. While each characteristic is important, the correct balance between the three components is desired to optimize the end product of the present invention. Viscosity is defined as a measure of the resistance of a substance to flow. Viscosity is measured using a Brookfield viscometer with a Helipath® stand with an F-T bar before the composition is aerated. It is believed that while the viscosity aids in holding the shape of a substance through aeration and deposit, the hardness aids in physical stability. The dissolvability, also a hardness measurement, is the change in hardness of a product in going from a dry to a wet state. With increased aeration, which aids in dissolvability, the hardness can be negatively affected. The compositions and methods of the present invention have unexpectedly discovered the optimum balance between viscosity, hardness and dissolvability to provide a physically stable and consumer acceptable product.

The composition of the present invention has a hardness value of from 0.5 to 8 pounds force, preferably from 1.5 to 5.5 pounds force.

The composition of the present invention has a dissolvability in the range of from 0.1 to 8 peak load.

The composition of the present invention has a viscosity of from 1,000 to 100,000 cp, dependent upon the temperature and speed of the viscometer used to measure the viscosity. In the preferred embodiment, the viscosity of the wet composition ranges from 30,000 to 60,000 cp at a 10 RPM speed of the spindle 6 in a Brookfield Viscometer. The most preferred range is from 35,000 to 50,000 cp.

Method of Making

A method of preparing a freeze-dried, aerated fruit or vegetable product comprising the steps of (a) providing a fruit or vegetable blend, (b) adding an emulsifier, (c) thermally processing the fruit or vegetable blend, (d) fermenting the blend, (e) admixing a gas with the blend; (f) simultaneously aerating the gas and the fruit or vegetable blend to form an aerated product, and (f) cooling the product; and (g) freeze-drying the product. Step (f) is included as an optional step.

Example 1

Puree Melts--Apple Strawberry
STEP 1 -- Puree Melts Blending

| Component | SA Number | Supplier | % of formula |
| --- | --- | --- | --- |
| Apple Puree, (12.5 brix) | IP04354 | Gerber | 55 |
| White Grape Juice Concentrate, (68 brix) | SA00298 | San Joaquin Valley Conc. | 7.5 |
| Strawberry Puree, Seedless, Organic | SA04786 | Cal Pacific | 12 |
| Tapioca Starch | Novation 3300 | National Starch | 1 |
| Pectin, High Methoxy | SA00458 | CP Kelco | 0.75 |
| Lactic Acid Esters of Mono/Diglycerides | SA70271 | Danisco | 0.4 |
| Citric Acid | SA00176 | Tate and Lyle | 0.1 |
| Ascorbic Acid | SA00886 | Weisheng | 0.1 |
| Water | SA00000 | | 18.65 |
| TOTAL | | | 95.5 |

Procedure:

1. Preblend starch, Pectin and LACTEM with water using high shear blender (such as bredo).
2. Add ascorbic acid and citric acid to mixture.
3. Slow blender speed to low and add white grape juice concentrate.
4. Finally, add apple puree and strawberry puree and blend on low speed 1 min.
5. Run puree blend through plate pastuerizer preheater, then homogenize 2500/500 psi (2-stage).
6. Thermally process puree mix at 190 deg F. for 2-8 minutes.
7. Cool to 41 deg. F.
8. Mixture can be deposited unaerated or aerated.
9. To Aerate, pump through Mondomix Aerator and admix nitrogen gas to target of 30-60% overrun.
10. Deposit as drops, 0.8-1.2 grams weight, onto solid steel freezer belt and freeze.
11. Freeze dry frozen drops.

The composition described above is made using the methods described herein.

It should be appreciated that the present invention is not limited to the specific embodiments described above, but includes variations, modifications and equivalent embodiments defined by the following claims.

What is claimed is:

1. A freeze-dried, aerated fruit and/or vegetable composition sized and shaped for consumption by a child, wherein the composition is pasteurized, the composition comprising:
   (a) at least one ingredient selected from the group consisting of a fruit, a vegetable, and combinations thereof, wherein the at least one ingredient is present in an amount from 60% to 80% by weight of the composition prior to freeze-drying;
   (b) an emulsifier selected from the group consisting of a citric acid ester of a monoglyceride and/or a diglyceride, a distilled monoglyceride, a lactylated monoglyceride and/or diglyceride, a polysorbate, caseinate, whey protein, egg white protein, and combinations thereof; and
   (c) a viscosity enhancer selected from the group consisting of starch, carrageenan, pectin, and combinations thereof; and
   wherein the composition is formed into a plurality of drops prior to freeze-drying, wherein the drops have a weight in a range of from 0.8 to 1.2 grams prior to freeze-drying, and wherein the composition is designed to be readily dissolvable upon consumption so as to reduce the risk of choking hazards for children with restricted or underdeveloped oral motor skills or digestive functions, the composition having a hardness value of from 0.5 to 8 pounds force peak load, a dissolvability in the range of from 0.1 to 8 pounds force peak load, and a viscosity of from 1000 to 100,000 cp as measured at a 10 rpm speed of the spindle 6 in a Brookfield viscometer before the composition is aerated.

2. The freeze-dried, aerated fruit and/or vegetable composition of claim 1, wherein (b) is a citric acid ester of a monoglyceride and/or a diglyceride.

3. The freeze-dried, aerated fruit and/or vegetable composition of claim 1, wherein (b) is a lactylated monoglyceride and/or diglyceride.

4. The freeze-dried, aerated fruit and/or vegetable composition of claim 1, wherein (b) is a lactylated monoglyceride.

5. The freeze-dried, aerated fruit and/or vegetable composition of claim 1, wherein (b) is present in an amount of from 0.1% to 0.4% by weight of the composition prior to freeze-drying.

6. The freeze-dried, aerated fruit and/or vegetable composition of claim 1, further comprising a gelling agent, wherein the gelling agent comprises gelatin.

7. The freeze-dried, aerated fruit and/or vegetable composition of claim 1, wherein (a) comprises at least two fruits.

8. The freeze-dried, aerated fruit and/or vegetable composition of claim 1, wherein (a) comprises at least two vegetables.

9. The freeze-dried, aerated fruit and/or vegetable composition of claim 1, wherein (a) comprises at least one fruit and at least one vegetable.

10. The freeze-dried, aerated fruit and/or vegetable composition of claim 1, further comprising at least one sugar.

11. A freeze-dried, aerated fruit and/or vegetable composition sized and shaped for consumption by a child, wherein the composition is pasteurized, the composition comprising:
    (a) at least one ingredient selected from the group consisting of a fruit, a vegetable, and combinations thereof, wherein the at least one ingredient is present in an amount from 60% to 80% by dry weight of the composition;
    (b) an emulsifier selected from the group consisting of a citric acid ester of a monoglyceride and/or a diglyceride, a distilled monoglyceride, a lactylated monoglyceride and/or diglyceride, a polysorbate, caseinate, whey protein, egg white protein, and combinations thereof, and wherein the emulsifier is present in an amount of from 0.1% to 0.4% by dry weight of the composition;
    (c) a viscosity enhancer selected from the group consisting of starch, carrageenan, pectin, and combinations thereof; and
    (d) a gelling agent, wherein the gelling agent comprises gelatin; and
    wherein the composition is formed into a plurality of drops prior to freeze-drying, wherein the drops have a weight in a range of from 0.8 to 1.2 grams prior to freeze-drying, and wherein the composition is designed to be readily dissolvable upon consumption so as to reduce the risk of choking hazards for children with restricted or underdeveloped oral motor skills or digestive functions, the composition having a hardness value of from 0.5 to 8 pounds force peak load, a dissolvability in the range of from 0.1 to 8 pounds force peak load, and a viscosity of from 1000 to 100,000 cp as measured at a 10 rpm speed of the spindle 6 in a Brookfield viscometer before the composition is aerated.

12. The freeze-dried, aerated fruit and/or vegetable composition of claim 11, wherein (b) is a citric acid ester of a monoglyceride and/or a diglyceride.

13. The freeze-dried, aerated fruit and/or vegetable composition of claim 11, wherein (b) is a lactylated monoglyceride and/or diglyceride.

14. The freeze-dried, aerated fruit and/or vegetable composition of claim 11, wherein (b) is a lactylated monoglyceride.

15. The freeze-dried, aerated fruit and/or vegetable composition of claim 11, wherein (a) comprises at least two fruits.

16. The freeze-dried, aerated fruit and/or vegetable composition of claim 11, wherein (a) comprises at least two vegetables.

17. The freeze-dried, aerated fruit and/or vegetable composition of claim 11, wherein (a) comprises at least one fruit and at least one vegetable.

18. The freeze-dried, aerated fruit and/or vegetable composition of claim 11, further comprising at least one sugar.

* * * * *